(12) United States Patent  
Komazaki et al.

(10) Patent No.: US 12,416,594 B2
(45) Date of Patent: Sep. 16, 2025

(54) HUMIDITY-SENSITIVE COMPOSITE MATERIAL AND HUMIDITY SENSOR

(71) Applicant: National Institute of Advanced Industrial Science and Technology, Tokyo (JP)

(72) Inventors: Yusuke Komazaki, Tsukuba (JP); Sei Uemura, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 475 days.

(21) Appl. No.: 17/429,802

(22) PCT Filed: Feb. 12, 2020

(86) PCT No.: PCT/JP2020/005375
§ 371 (c)(1),
(2) Date: Aug. 10, 2021

(87) PCT Pub. No.: WO2020/166616
PCT Pub. Date: Aug. 20, 2020

(65) Prior Publication Data
US 2022/0128501 A1  Apr. 28, 2022

(30) Foreign Application Priority Data
Feb. 15, 2019 (JP) ................. 2019-025696

(51) Int. Cl.
*G01N 27/12* (2006.01)
(52) U.S. Cl.
CPC ......... *G01N 27/121* (2013.01); *G01N 27/125* (2013.01)
(58) Field of Classification Search
CPC ................ G01N 27/121; G01N 27/125
(Continued)

(56) References Cited

U.S. PATENT DOCUMENTS 4,656,455 A * 4/1987 Tanino .................. C04B 35/486
427/126.3
4,673,910 A * 6/1987 Uchikawa ............ G01N 27/121
338/35
(Continued)

FOREIGN PATENT DOCUMENTS

JP    H02-086101 A     3/1990
JP     -02-253822 A    10/1990
(Continued)

OTHER PUBLICATIONS

Humidity Sensitive Element and Method of Manufacturing the Same (Year: 2003).*
(Continued)

*Primary Examiner* — Peter J Macchiarolo
*Assistant Examiner* — Rodney T Frank
(74) *Attorney, Agent, or Firm* — Osha Bergman Watanabe & Burton LLP

(57) ABSTRACT

Provided are a stretchable humidity-sensitive composite material for a humidity sensor that can be applied to clothing as wearable device, and the humidity sensor. The humidity-sensitive composite material is characterized by containing a deliquescent inorganic compound in closed pores inside a base material made of a porous silicone resin. The humidity sensor is characterized in that a bulk made of a humidity-sensitive composite material containing a deliquescent inorganic compound in closed pores inside a base material made of a porous silicone resin is sandwiched between a pair of counter electrodes made of a moisture-permeable material.

5 Claims, 3 Drawing Sheets

(58) Field of Classification Search
USPC .................................................... 73/29.05
See application file for complete search history.

(56) References Cited

U.S. PATENT DOCUMENTS

| | | | | |
|---|---|---|---|---|
| 5,381,914 A * | 1/1995 | Koyama | .............. | B65D 51/244 |
| | | | | 426/118 |
| 6,126,312 A | 10/2000 | Sakai et al. | | |
| 6,428,717 B1 | 8/2002 | Sakai et al. | | |
| 10,801,985 B2 | 10/2020 | Cook et al. | | |
| 2002/0190840 A1 | 12/2002 | Fujita et al. | | |
| 2013/0316166 A1 * | 11/2013 | Levy Cohen | ........ | B01J 20/3206 |
| | | | | 521/149 |
| 2017/0247247 A1 * | 8/2017 | Zhang | ................. | B81C 1/00246 |
| 2017/0350846 A1 | 12/2017 | Cook et al. | | |

FOREIGN PATENT DOCUMENTS

| | | | | |
|---|---|---|---|---|
| JP | H04-122434 A | 4/1992 | | |
| JP | H11-023507 A | 1/1999 | | |
| JP | 2001049022 A * | 2/2001 | | |
| JP | 3481855 B2 * | 12/2003 | ........... | G01N 27/121 |
| JP | 2005-031090 A | 2/2005 | | |
| JP | 2008-012432 A | 1/2008 | | |
| JP | 2008-207502 A | 9/2008 | | |
| JP | 2011-185745 A | 9/2011 | | |
| JP | 2018-150206 A | 9/2018 | | |
| JP | 2018-164441 A | 10/2018 | | |
| JP | 6466014 B1 | 2/2019 | | |
| WO | WO-2010103856 A1 * | 9/2010 | ............. | C01B 37/00 |
| WO | 2011/150237 A1 | 12/2011 | | |

OTHER PUBLICATIONS

JP2001049022 (Year: 2001).*
WO2010103856 (Year: 2010).*
Notice of Reasons for Refusal issued in corresponding Japanese Application No. 2020-572281 mailed May 16, 2023 (7 pages).
Wakabayashi, H et al., "Development of humidity sensor with composite material and designing of its electronic circuit" Circuit technology, vol. 4, No. 7. p. 353-359, 1989, with English abstract (8 pages).
International Search Report issued in corresponding International Application No. PCT/JP2020/005375; dated Apr. 20, 2020 (3 pages).
Written Opinion of the International Searching Authority issued in corresponding International Application No. PCT/JP2020/005375; dated May 12, 2020 (3 pages).
Extended European search report issued in corresponding European Application No. 20755445.2 dated Sep. 28, 2022 (8 pages).
C. Ataman et al., "Humidity and Temperature Sensors on Plastic Foil for Textile Integration", Procedia Engineering, vol. 25, Jan. 2, 2012, pp. 136-139 (4 pages).
Erick Castellon et al., "Novel Reversible Humidity-Responsive Light Transmission Hybrid Thin-Film Material Based on a Dispersive Porous Structure with Embedded Hygroscopic and Deliquescent Substances", Advanced Functional Materials, [Online] vol. 28, No. 27, Oct. 24, 2017, p. 1704717 (8 pages).
Ching-Hsiu Chen et al., "In-Situ Formation of an Ion-Doped Porous Structure for High Sensitive Humidity Sensing Utilizing Low-Cost UV Sensitive Glue", Transducers 2009: 2009 International Solid-State Sensors, Actuators and Microsystems Conference; Denver, Colorado, USA, Jun. 21-25, 2009, IEEE, Piscataway, NJ, USA, Jun. 21, 2009, pp. 1694-1697 (4 pages).
Office Action issued in corresponding Chinese Patent Application No. 202080011049.0, dated Sep. 9, 2023, (10 pages).

* cited by examiner

HUMIDITY-SENSITIVE COMPOSITE MATERIAL AND HUMIDITY SENSOR

TECHNICAL FIELD

The present invention relates to a humidity-sensitive composite material obtained by compounding a porous material with a humidity-sensitive material and a humidity sensor including the composite material, and specifically relates to a humidity-sensitive composite material having stretchability and a humidity sensor including the composite material.

BACKGROUND ART

As one of humidity-sensitive (humidity) sensors to detect a change in the humidity in a space, there has been known a humidity-sensitive indicator that enables a change in the humidity to be visually recognized via a color change. For this purpose, a coating made of a humidity-sensitive composite material obtained by combining a material that changes its color by humidity with other materials may be used.

For example, Patent Literature 1 discloses a coating comprising an electron-donating color developing compound, an acidic compound that is solid at normal temperature, a deliquescent substance, porous particles, and an aqueous resin emulsion, as a coating for humidity-sensitive indicators. Here, employed is a fact that the porous particles absorb moisture faster than the deliquescent substance does, and when the amount of moisture absorbed by the porous particles approaches to its saturation, the deliquescent substance starts to absorb moisture and is fluidized. As the amount of the porous particles added increases, the humidity to be detected by the humidity-sensitive indicator shifts to a higher region, and the color is assumed to be changed or decolored.

Alternatively, there has been known a humidity-sensitive sensor that detects a change in the humidity in a space as an electrical change.

For example, Patent Literature 2 discloses a humidity-sensitive composite material for humidity sensors obtained by combining porous apatite hydroxide with an inorganic halide such as calcium chloride or ammonium chloride. When a molded article of such a humidity-sensitive composite material is provided with a pair of electrodes, it is assumed that variation in the relative humidity in the gas in contact with the molded article can be detected via variation in the impedance value between the electrodes.

Incidentally, as described in Non-Patent Literature 1, in the case of monitoring a human who feels heat and discomfort or the vicinity of the human, for a wet bulb globe temperature index for use in prevention of heatstroke and the like and a discomfort index for evaluation of the environment, providing clothing or the like worn by the human with a humidity-sensitive sensor is considered. A humidity-sensitive composite material may be used also here. Non-Patent Literature 1 states that a humidity-sensitive composite material obtained by compounding ceramic with a polymer may achieve excellent water resistance and resistance against high humidity at room temperature and be stably used under a highly humid atmosphere for a long period. Specifically, Non-Patent Literature 1 discloses a humidity-sensitive composite material obtained by coating a ceramic fired body based on titania/copper oxide with a polymer.

CITATION LIST

Patent Literature

Patent Literature 1: JP 2011-185745 A
Patent Literature 2: JP 2-86101 A

Non Patent Literature

Non Patent Literature 1: "Development of humidity sensor with composite material and designing of its electronic circuit"; written by Hidechika WAKABAYASHI and Ichiro UTASHIRO; Circuit technology, Vol. 4 (1989), No. 7, p. 353 to 359

SUMMARY OF INVENTION

Technical Problem

As described above, it has been proposed to provide clothing or the like worn by a human with a humidity-sensitive sensor. Such a humidity-sensitive sensor as a wearable device is required to follow human movements and give stable humidity measurement. That is, the humidity-sensitive sensor is required to have stretchability and not to greatly affect the humidity responsiveness due to this stretching.

The present invention has been made in view of the above circumstances, and an object of the present invention is to provide a humidity-sensitive composite material having stretchability for a humidity sensor applicable to clothing as a wearable device, and this humidity sensor.

Solution to Problem

The humidity-sensitive composite material according to the present invention is characterized by containing a deliquescent inorganic compound in closed pores inside a base material made of a porous silicone resin.

According to the present invention, there may be provided a humidity-sensitive component (member) such as a humidity-sensitive sensor that may follow human movements and provide stable humidity measurement.

In the invention described above, the pores may be substantially spherical independent pores dispersed. According to the present invention, there may be provided a humidity-sensitive sensor that provides stable humidity measurement.

In the invention described above, the inorganic compound may be characterized by being a metal chloride. The metal chloride may be any one of chlorides of lithium, magnesium, potassium, and calcium or a combination thereof. According to the present invention, there may be provided a humidity-sensitive sensor that provides stable humidity measurement.

The humidity sensor according to the present invention is also characterized in that a bulk made of a humidity-sensitive composite material obtained by containing a deliquescent inorganic compound in closed pores inside a base material made of a porous silicone resin is sandwiched between a pair of counter electrodes made of a moisture-permeable material.

According to the present invention, it is possible to follow human movements and provide stable humidity measurement.

The invention described above may be characterized by giving a change in ambient humidity via a change in the dielectric constant. According to the present invention, it is possible to provide stable humidity measurement.

In the invention described above, the pores may be substantially spherical independent pores dispersed. According to the present invention, it is possible to provide stable humidity measurement.

In the invention described above, the inorganic compound may be characterized by being a metal chloride. The metal chloride may be any one of chlorides of lithium, magnesium, potassium, and calcium or a combination thereof. According to the present invention, it is possible to provide stable humidity measurement.

DESCRIPTION OF EMBODIMENTS

Hereinafter, a humidity-sensitive composite material and a humidity sensor according to one embodiment of the present invention will be described with reference to FIG. 1 and FIG. 2.

Figure 1:
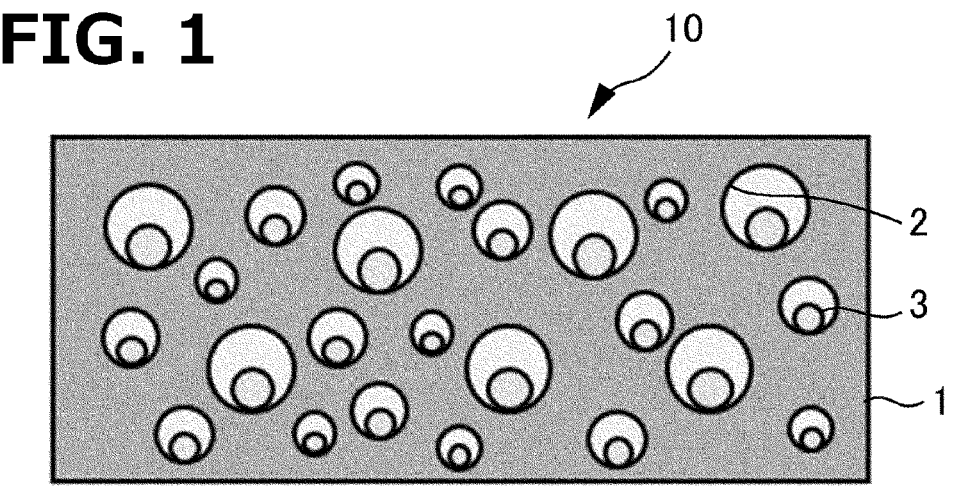
FIG. 1 is a cross-sectional view of a humidity-sensitive composite material as an example according to the present invention.

As shown in FIG. 1, a humidity-sensitive composite material 10 includes a large number of closed pores 2 inside a base material 1 made of a porous silicone resin. Each of the pores 2 accommodates the deliquescent inorganic compound 3 therein. The pores 2 are preferably, for example, independent closed pores without communicating with one another. The independent pores are also preferably substantially spherical and dispersed.

Examples of the deliquescent inorganic compound 3 include magnesium bromide, magnesium chloride, calcium chloride, potassium chloride, calcium bromide, sodium chloride, magnesium sulfate, calcium sulfate, sodium bromide, calcium nitrate, magnesium nitrate, and hydrates thereof. As described below, one of or a combination of these may be used depending on a desired level of humidity sensitivity. A metal chloride is preferable, and at least any one of or a combination of chlorides of lithium, magnesium, potassium, and calcium is preferred.

Here, the base material 1 made of a porous silicone resin is permeable to water vapor but impermeable to liquid water. Accordingly, the humidity-sensitive composite material 10 can absorb water vapor that has entered the independent pores 2 with the inorganic compound 3 to generate a deliquescent liquid, and can hold the deliquescent liquid in the pores 2.

Since the absorption and release of water vapor by the deliquescent substance is an equilibrium phenomenon in accordance with the partial pressure of the water vapor, the humidity-sensitive composite material 10 absorbs a large amount of water vapor and holds the water vapor inside as a deliquescent liquid until equilibrium with the surrounding water vapor partial pressure is achieved. On the other hand, the deliquescent liquid, which is retained in the closed pores 2, neither leaks nor electrically short-circuits the humidity-sensitive composite material 10.

That is, detecting the amount of the deliquescent liquid retained by the humidity-sensitive composite material 10 enables a humidity sensor to be provided.

Figure 2:
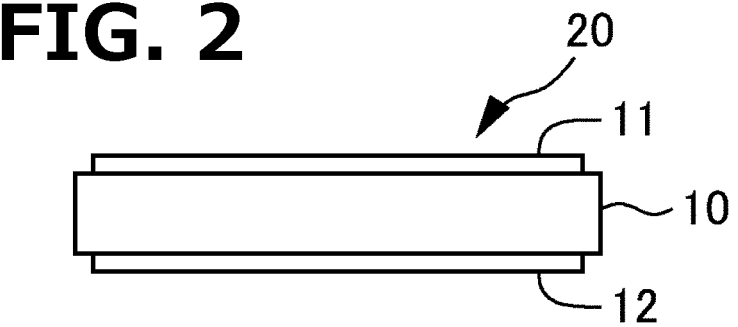
FIG. 2 is a side view of a humidity sensor as an example according to the present invention.

For example, as illustrated in FIG. 2, sandwiching the bulk of the humidity-sensitive composite material 10 between a pair of counter electrodes 11 and 12 enables a humidity sensor 20 to be provided. At least one of the counter electrodes 11 and 12 is preferably made of a moisture-permeable material. That is, detecting a change in the dielectric constant based on the amount of the deliquescent liquid retained by the humidity-sensitive composite material 10 enables a change in the surrounding water vapor partial pressure to be detected and thus a change in the humidity to be detected.

In particular, the humidity-sensitive composite material 10 including a silicone resin as the base material 1 has flexibility and stretchability and can be flexibly deformed. Therefore, when a material having flexibility and stretchability is used as the counter electrodes 11 and 12, the humidity sensor 20 can be suitably attached to clothing as a wearable device. Then, the humidity sensor 20 can follow human movements and provide stable humidity measurement. The humidity-sensitive composite material 10 can be made use of to provide various humidity-sensitive components (members).

Next, an exemplary actually-manufactured humidity sensor 20 including the humidity-sensitive composite material 10 will be described with reference to FIGS. 3 and 4.

As the silicone resin for the base material 1, PDMS (polydimethylsiloxane) was used. As the inorganic compound 3, calcium chloride was used.

First, an aqueous solution of calcium chloride at a concentration of 0 to 30 wt % and a PDMS prepolymer were mixed at a weight ratio of 1:2 and well stirred to obtain an emulsion in which the calcium chloride aqueous solution was dispersed. Incidentally, an aqueous solution of calcium chloride at a concentration of 0% by weight means water. The emulsion was spin-coated at a thickness of about 10 μm on a plate-shaped Al electrode and cured by heating. Au was sputtered on the cured calcium chloride-PDMS composite film to produce a moisture-permeable electrode having a thickness of 20 nm. That is, produced was the humidity sensor 20, which is an element having a structure including a calcium chloride-PDMS composite membrane sandwiched between (moisture-permeable) electrodes.

The produced humidity sensor 20 was placed in a thermostatic bath at 25° C. The capacitance of the humidity sensor 20 was measured while the humidity inside the thermostatic bath was changed from 30 to 95%, and then, the relative permittivity of the humidity sensor 20 with respect to the humidity was provided.

Figure 3:
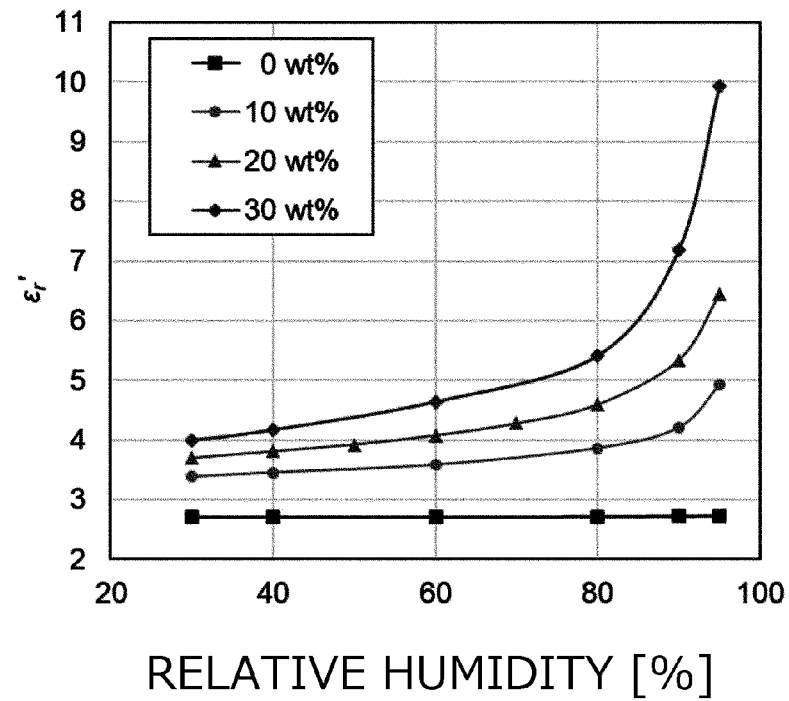
FIG. 3 is a graph showing a relationship between the relative humidity and the real part of the relative permittivity of the humidity sensor.

As shown in FIG. 3, the value of the real part ($\varepsilon_r'$) of the relative permittivity did not substantially change when no calcium chloride was contained (0 wt %). In contrast, when calcium chloride was contained, the value increased with an increase in humidity, and the value rapidly increased particularly at a relative humidity of 80% or more.

Figure 4:
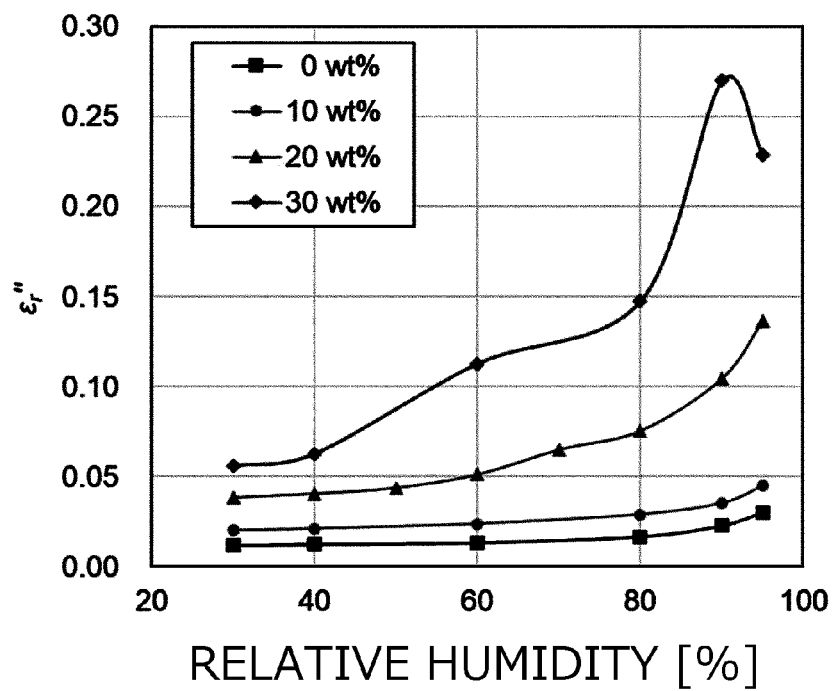
FIG. 4 is a graph showing a relationship between the relative humidity and the imaginary part of the relative permittivity of the humidity sensor.

As shown in FIG. 4, the value of the imaginary part ($\varepsilon_r''$) of the relative permittivity increased as the humidity increased, but the value was very small as compared with the real part.

From the above, it was shown that the produced humidity sensor 20 contained calcium chloride as the inorganic compound 3 in the pores 2 and did not cause leakage of the generated deliquescent liquid or a short circuit accompanying the leakage even in a high humidity region.

Further, the humidity sensor 20 is produced from the humidity-sensitive composite material 10 with the inorganic compound 3 changed, and the results of examination on the change in the capacitance with respect to the humidity for each will be described. The used materials as the inorganic compound 3 were 3 metal chlorides: lithium chloride, potassium chloride, and magnesium chlorid. Each of the chlorides was caused to be contained in an amount of 9% by weight in the humidity-sensitive composite material 10 as with the calcium chloride described above. As the silicone resin to be the base material 1 of the humidity-sensitive composite material 10, PDMS was used. For the humidity sensor 20 including each of the humidity-sensitive composite materials 10, the capacitances at relative humidities of 30%, 60%, and 90% were measured.

Figure 5A:
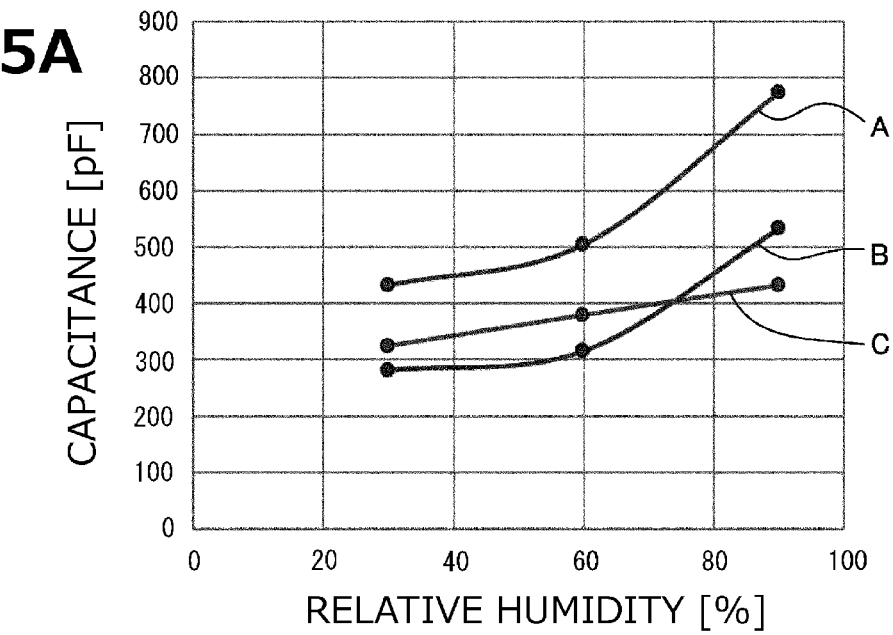
FIG. 5 are graphs showing a relationship between the relative humidity and the capacitance of an inorganic compound, (a) is a graph of the measured capacitance, and (b) is a graph of the ratio of the capacitance to the capacitance at a humidity of 30%.
Figure 5B:
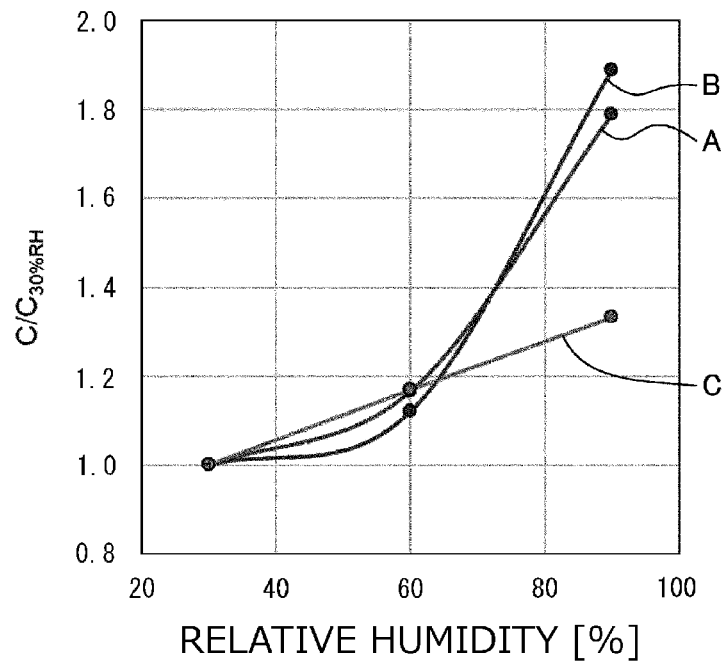

The measured capacitance and the ratio of the capacitance to the capacitance at a humidity of 30%, which was set to 1, are shown in FIGS. 5(a) and 5(b), respectively. In any of a case A where lithium chloride was used (hereinafter, referred to as A.), a case B where potassium chloride was used (hereinafter, referred to as B.), and a case C where magnesium chloride was used (hereinafter, referred to as C), the capacitance tended to increase as the relative humidity increased. In A and B, the change was small in a range of relative humidity from 30% to 60%, and the change was large in a range of relative humidity from 60% to 90%. In particular, although the absolute values were different, the ratios of the capacitance to the capacitance at a humidity of 30%, which was set to 1 (see FIG. 5 (b)), showed very similar changes in both A and B. In C, the overall change amount in a range of relative humidity from 30% to 90% was smaller than those in A and B, but the change was linear as a whole.

Although the examples according to the present invention and the modifications based thereon have been described above, the present invention is not necessarily limited thereto. Those skilled in the art would be able to find various alternative examples and altered examples without departing from the gist of the present invention or the appended claims.

REFERENCE SIGNS LIST

1 Base material
2 Pore
3 Inorganic compound
10 Humidity-sensitive composite material
20 Humidity sensor

The invention claimed is:

1. A humidity sensor, wherein a bulk made of a humidity-sensitive composite material provides the absorption and release of water vapor, containing:
   a deliquescent inorganic compound in a base material made of a porous silicone resin, wherein:
      the base material containing the deliquescent inorganic compound is sandwiched between a pair of counter electrodes made of a moisture-permeable material,
      the base material includes independent closed pores and a deliquescent liquid, comprising water and the deliquescent inorganic compound, retained in each of the independent closed pores inside the base material,
      the independent closed pores are non-uniform in size, and
      the independent closed pores are located randomly inside the base material.

2. The humidity sensor according to claim 1, wherein a change in ambient humidity is given by a change in a dielectric constant.

3. The humidity sensor according to claim 2, wherein the pores are substantially spherical independent pores dispersed.

4. The humidity sensor according to claim 3, wherein the inorganic compound is a metal chloride.

5. The humidity sensor according to claim 4, wherein the metal chloride is any one of chlorides of lithium, magnesium, potassium, and calcium or a combination thereof.

* * * * *